United States Patent [19]
Portyrata

[11] 3,834,535
[45] Sept. 10, 1974

[54] SWIMMING POOL FILTERING SYSTEM
[75] Inventor: Raymond E. Portyrata, North Haven, Conn.
[73] Assignee: Diaclear, Inc., Hamden, Conn.
[22] Filed: Aug. 9, 1972
[21] Appl. No.: 279,281

[52] U.S. Cl.................. 210/75, 210/77, 210/82, 210/108, 210/351, 210/356
[51] Int. Cl.................. B01d 37/02, B01d 23/24
[58] Field of Search....... 210/71, 82, 108, 169, 351, 210/355, 356, 75, 77

[56] References Cited
UNITED STATES PATENTS

| | | | |
|---|---|---|---|
| 2,221,210 | 11/1940 | Soderquist | 210/356 X |
| 2,862,622 | 12/1958 | Kircher, Jr. et al. | 210/82 X |
| 3,180,825 | 4/1965 | Couvreur et al. | 210/351 X |
| 3,276,594 | 10/1966 | Gwilliam | 210/356 X |
| 3,390,772 | 7/1968 | Juhasz | 210/71 X |
| 3,581,895 | 6/1971 | Howard et al. | 210/108 |
| 3,670,898 | 6/1972 | Fournier | 210/356 |

*Primary Examiner*—Samih N. Zaharna
*Assistant Examiner*—Robert H. Spitzer
*Attorney, Agent, or Firm*—Sperry and Zoda

[57] ABSTRACT

A filtering system is disclosed including a filter tank, a pump for directing liquid through an inlet into the tank and a liquid outlet formed for directing liquid from the tank to a swimming pool, or the like. A particulate filter may be disposed between the inlet and outlet of the tank and may generally comprise a layer of filter particles disposed on an upstream side of a porous, filter substrate member. Apparatus is included for automatically homogenizing the filter particles with the dirt deposits, captured on and within the filter. The automatic apparatus may include an expansible/compressible member disposed adjacent the filter substrate on a downstream side thereof. A valve may be disposed within the outlet of the tank and, upon closing the valve and operating the pump to force water through the inlet, the expansible/compressible member may be compressed to within a fraction of its original volume. The pump may then be suddenly shut off so as to cause the expansible/compressible member to suddenly expand, to force water in an upstream direction through the filter substrate, so as to knock the filter particles off the substrate and to generally evenly mix (homogenized) filter particles with the captured dirt.

A waste outlet may be provided, and, upon the completion of a desired number of automatic homogenizing cycles, the waste outlet may be opened and the pump used to pump all the dirt carrying filter particles out through the waste outlet. Thereafter, new filter particles may be transmitted through the pump to the upstream side of the filter substrate.

11 Claims, 11 Drawing Figures

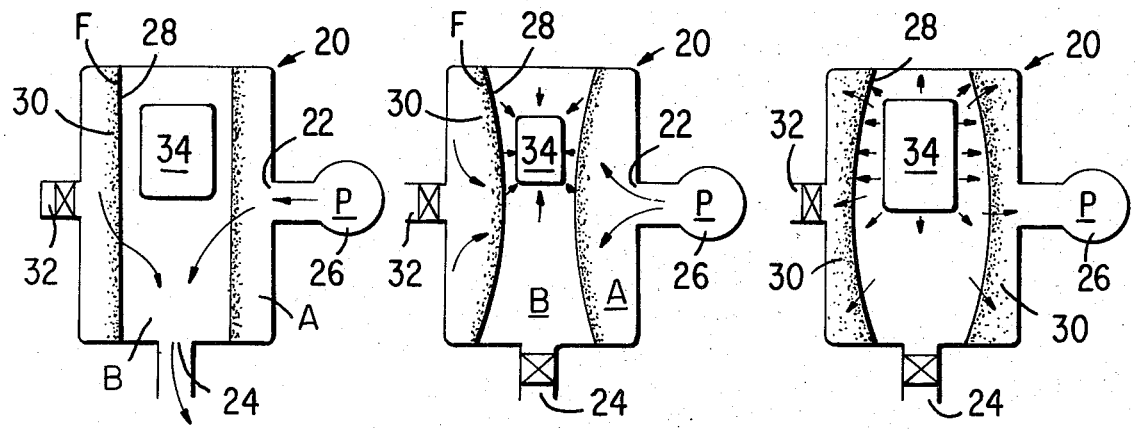
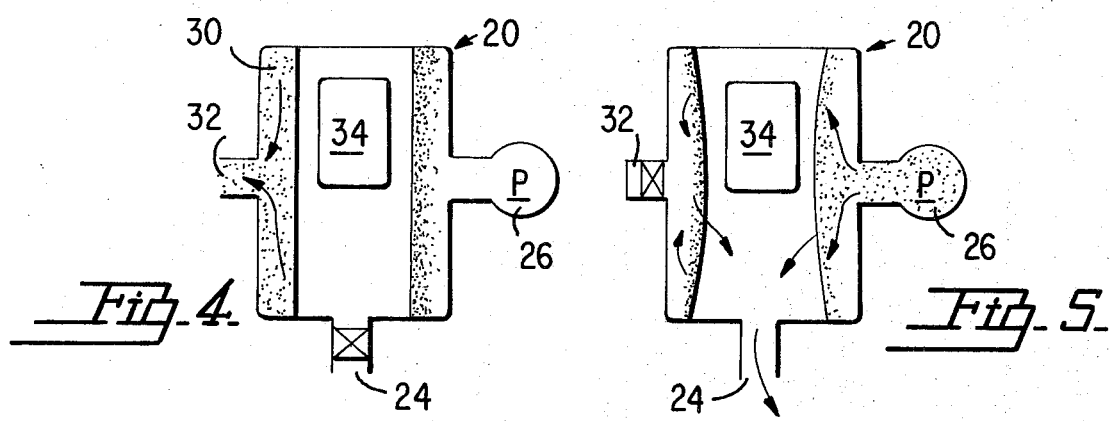
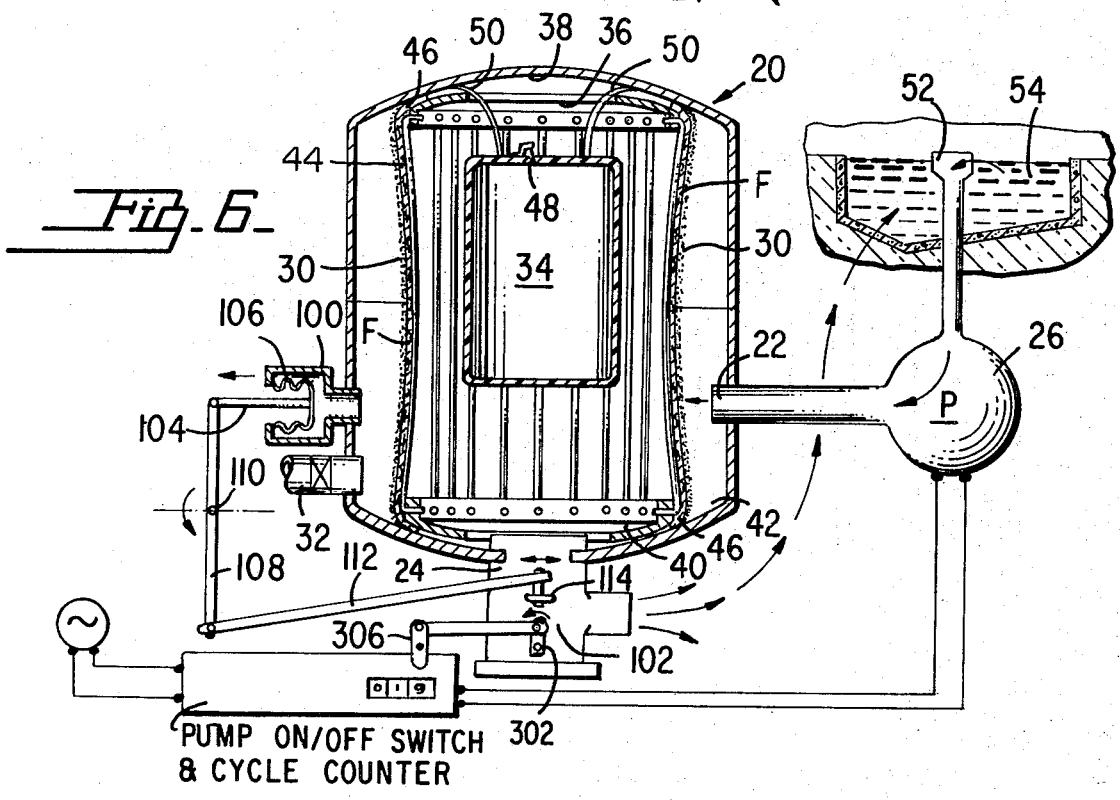

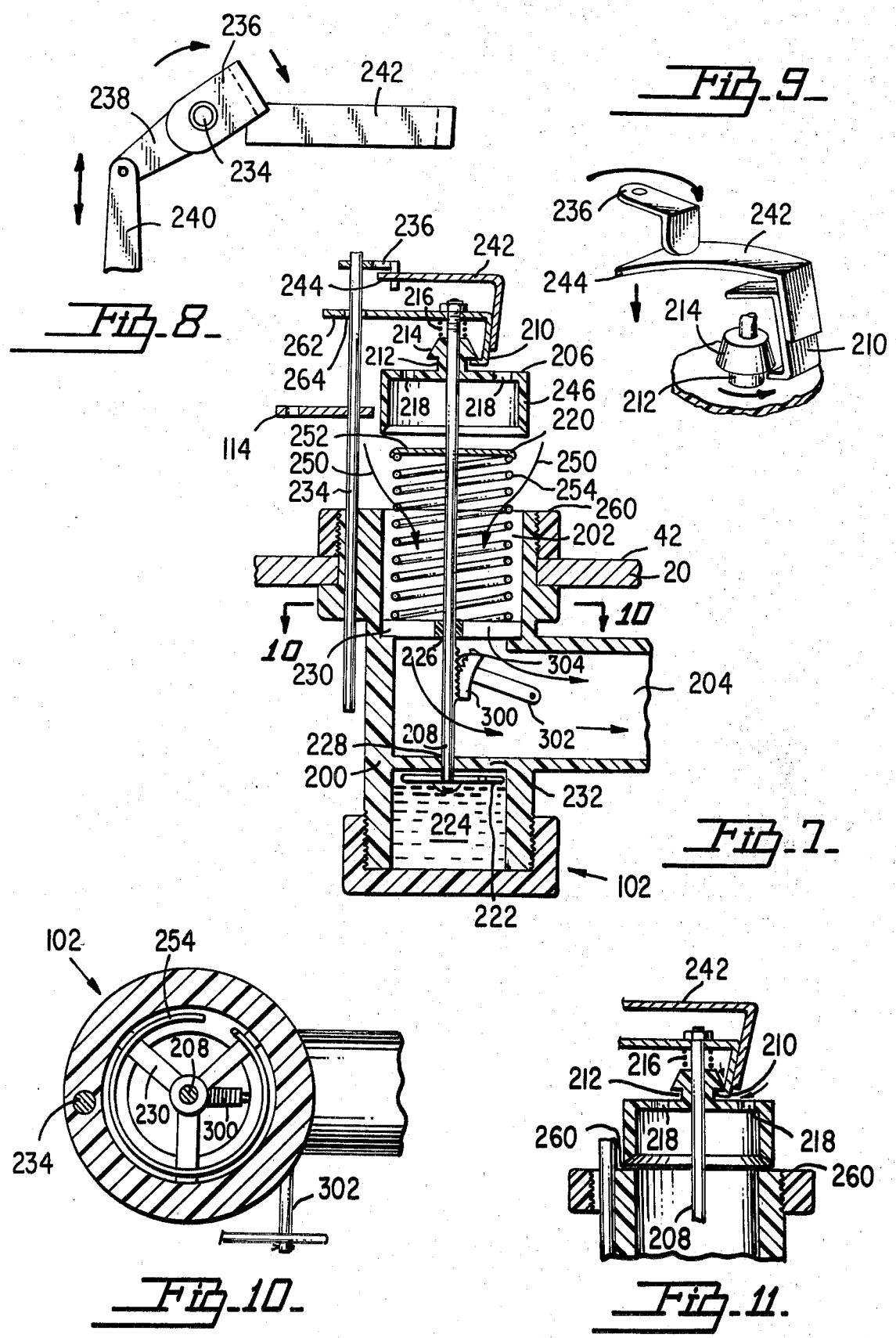

SWIMMING POOL FILTERING SYSTEM

BACKGROUND OF THE INVENTION

The present invention relates to the automatic operation of filtering systems and, more specifically, relates to the automatic operation of particulate filters, especially adapted for use with swimming pools.

Filters perform a very essential function in cleaning and maintaining the cleanliness of the water in a swimming pool. Some dirt settles as sediment on the pool floor, and can be vacuumed off through a suction head connected with an outlet fitting in the pool wall, which, in turn, connects with the filter of the system. Other sediment may be drawn off through the pool drain to also be conveyed to the filter. However, the greater portion of the dirt, inclusive of debris settling on the water, may be drawn off to the filter through a skimming device, mounted in the pool wall at water level.

The cleanliness of the water depends on the effectiveness of the skimming operation. When the skimming operation removes most of the dirt particles from the water, a lesser amount of dirt will settle to the bottom of the pool.

The efficiency of the skimming operation depends, in large measure, upon the maintenance of a substantial flow from the surface level of the pool into the skimming apparatus. This flow, however, would be impaired, if the filter were permitted to be choked with dirt. This is because all the water from the pool is circulated by a pump through the filter and then is directed back to the pool.

It is customary, therefore, to clean the filter at intervals, by reversing the flow of water therethrough and usually discarding the filter and water to waste. When the filter is of a diatomaceous earth type, it is common practice to "bump" the filter substrate so as to knock the diatomaceous earth off the substrate and to generally evenly homogenize the captured dirt with the filter particles.

Such an operation, heretofore, has been generally performed maly. Since such operations are usually done manually, little attention has been paid to the timing of the "bumping" cycles. Accordingly, the timing of such "bumping" has had little, if any relationship to the need for "bumping". Sometimes this operation is initiated when not required, and most often after the filter media has greatly exceeded the concentration level at which a "bumping" or backwash operation would normally be called for.

Automatic backwashing has been attempted in the past, but apparently without too much commercial success, as such automatic systems are generally hydraulically actuated and controlled with a time clock so as to periodically perform the backwashing operation, whether the filter needed cleaning or not.

Accordingly, it would be advantageous if an automatic system were provided for "bumping" a particulate filter directly in response to the sensing of a condition wherein the filter is overloaded with dirt particles.

OBJECTS AND SUMMARY OF THE INVENTION

It is therefore an object of the present invention to provide an automatic filter system which solves many of the problems confronting industry today.

It is another object of the present invention to provide an automatic filter system which automatically homogenizes filter particles with the particles of dirt in response to a saturated filter condition.

It is yet another object of the present invention to provide an automatic filter system which may be inexpensively manufactured and provided to the consumer at a reasonable cost.

It is a major object of the present invention to provide an automatic filter system which may be completely automated so as to insure that a swimming pool filter is never operating under a saturated condition.

At least some of the above-mentioned objects are achieved by the provision of an expandable member disposed on the upstream side of a particulate filter substrate. In response to a saturated filter condition, the expansible member is suddenly expanded to force water in the upstream direction, so as to knock the filter particles off the substrate and to thereby "bump" the particles into a homogeneous mixture.

BRIEF DESCRIPTION OF THE DRAWINGS

While the invention is particularly pointed out and distinctly claimed in a concluding portion of the specification, a preferred embodiment is set forth in the following detailed description which may be best understood when read in connection with the accompanying drawings, in which:

FIG. 1 is a schematic view of a filter tank according to the present invention, wherein water is being filtered in a normal manner;

FIG. 2 shows the filter system of FIG. 1, wherein the water outlet has been shut off and a continuously running pump is compressing a compressible/expandable member;

FIG. 3 is a schematic view of the system, shown in FIGS. 1 and 2, depicting the moment when the pressure has been released on the expandable member so as to permit the expandable member to force water back through a filter substrate, to "bump" the filter particles;

FIG. 4 is a schematic view of the apparatus shown in FIGS. 1-3, wherein a waste outlet has been opened and the used filter particles and dirt, entrapped therein, are being expelled through the waste outlet;

FIG. 5 is a diagrammatic view of the apparatus shown in FIGS. 1-4, wherein new filter particles are being introduced to the filter tank;

FIG. 6 is a schematic view of an overall apparatus according to present invention;

FIG. 7 is a vertical sectional view of an automatic valve of the present invention;

FIG. 8 is a top plan view of a camming mechanism incorporated in the preferred embodiment of the present invention;

FIG. 9 is a perspective view of the camming mechanism shown in FIG. 8;

FIG. 10 is a radial sectional view of the device of FIG. 7, taken along line 10—10; and FIG. 11 is an axial sectional view of an upper portion of the valve shown in FIG. 7, shown at the end of a recocking operation.

DETAILED DESCRIPTION OF THE PREFERRED EMBODIMENT

Referring now to the drawings in which like numerals are used to indicate like parts throughout the various views thereof, FIG. 1 is a schematic view of a filter tank 20, according to the present invention.

I. General Operation of System

The tank 20 may be provided with an inlet 22 and an outlet 24. A pump 26 may be used to force water from a pool (not shown) into the tank 20 and through a filter F, whereupon, the water exits through the outlet 24 and is directed back to the pool.

The filter F, may comprise a substrate member 28 which may be, for example, a fine mesh plastic fabric, or the like. A layer of diatomaceous earth particles 30 may be deposited on the upstream side of the substrate 28 and is generally held in place in response to the normal flow of water through the filter. The filter partitions the tank into an inlet chamber A and an outlet chamber B (see FIG. 1).

A waste outlet 32 may be provided for dumping diatomaceous earth particles 30 which have become saturated with dirt particles.

An expandable/compressible member 34 may be disposed on a downstream side of the filter substrate 28 and it is this member 34 which becomes the operative element in "bumping" the filter particles 30 from the substrate 28. This operation is shown in more detail in connection with FIGS. 2 and 3.

Referring now to FIG. 2, it can be seen that both the waste outlet 32 and water oulet 24 have been closed so that pump 26 is operable to pressurize the interior of the tank 20. As the interior of the tank 20 is pressurized, the member 34 is compressed to within a fraction of its size, while the diatomaceous particles still adhere to the upstream surface of the substrate 28.

FIG. 3 shows the member 34 at the moment of expansion, at which time the pump 26 has reached its cut-off pressure and the pressure within the tank 20 is immediately released. Upon releasing the pressure within the tank 20, the suddenly expanding member 34 is operable to force water in an upstream direction back through the filter substrate 28 so as to "bump" the diatomaceous earth particles 30 off the substrate. It will be noted, that the waste outlet 32 and the pool water outlet 24 are maintained in a closed condition.

Referring to FIG. 4, it can be seen that the waste outlet 32 has been opened and saturated diatomaceous earth particles 30 are being pumped out of the tank 20, while the pool water outlet 24 is maintained in a closed condition.

FIG. 5 shows the waste outlet 32 in a closed condition and the pool water outlet 24 open while diatomaceous earth particles are being pumped into the tank 20. It will be noted that the diatomaceous earth particles are forced to adhere to the substrate member 28 in a filtering layer in response to the normal flow of water from the pump 26 and out to the outlet 24. Of course, since the pressure within the tank 20 is lowered by the flowing of the water, a member 34 will maintain its normal size and shape until it is again compressed as shown in FIG. 2.

II. Overall Apparatus

Referring now to FIG. 6, a partial schematic and partial sectional view of overall apparatus according to the present invention is shown in vertical sectional view. As can be seen, the tank 20 may be of a generally cylindrical nature having an annular angle member 36, mounted on an inner, upper wall 38 thereof. A similar annular member 40 may be mounted on an inner, lower wall 42.

Axially extending wires 44 may be mounted between the annular members 36 and 40. The fabric-like filter substrate 46 may be supported over the wire members 44 in a cylindrical configuration and may be secured by impinging the marginal axial ends of the substrate 46 between the members 36, 40 and the respective walls 38 and 42.

The expansible/compressible member 34 may comprise an air bag having a valve 48, provided for the inflation of the bag. The bag may be supported within the cage-like configuration of the wires 44, by means of straps 50 having terminal ends impinged between the member 36 and the upper, inner wall 38. Through such a mounting arrangement, the air bag 34 is disposed generally co-axially within the cage-like configuration presented by the wire members 44.

As can be seen, the pump 26 is operable to draw water through a skimmer device 52 disposed at the water level of the pool 54. Upon the introduction of diatomaceous earth particles into the skimmer device 52, the pump 26 is operable to force the water and the diatomaceous earth entrained therein, through the substrate 46 so as to form the filter layer 30.

After passing through the overall filter F, the water is directed downwardly through the outlet 24 and, thence, back to the pool 54.

A pressure sensitive bellows type device 100 may be provided in a side wall portion of the tank 20 and may be mechanically, or otherwise operatively linked with a valve 102, disposed within the outlet 24 of the overall system.

More specifically, a push-rod 104 may be attached to the bellows portion 106 of the device 100 so that when pressure builds up within the tank (due to dirt covering the outer surface of the diatomaceous earth particles 30), the rod 104 moves to the left.

This movement of rod 104 is operable, in turn, to pivot the linkage 108 about the pivot point 110. The link 108, is operable to translate the linkage 112 in a back and forth motion. Link 112 may be connected with an operative member 114 of the valve 102 which will be described in more detail with respect to FIGS. 7–11.

III. Details of Outlet Valve

Referring now to FIG. 7, the operative members of the overall valve 102 are shown in vertical sectional view.

A casing 200 is provided having an inlet 202 and an outlet 204. The casing 200 may be fitted within an opening formed in the lower wall of the filter tank 20. A bell-like member 206 may be axially aligned over the opening 202 of the casing 200 and may be supported, in position, by a support rod 208. A resilient finger member 210 may be mounted on an upper portion of the rod 208 for resilient engagement within recess 212 of an upper camming member 214 of the bell 206. A spring member 216 may be co-axially disposed about the rod 208 to urge an upper surface, defining the recess 212, against the finger 210.

The bell 206 may be formed with axial openings 218 formed in an upper horizontal wall portion thereof.

A disc-like valve member 220 may be fixed to the rod 208 at a position beneath the normal mounting position of the bell 206. The lower end of the rod 208 may terminate in a disc-like piston member 222 which may be disposed within an oil filled damping chamber 224, thus providing, in the parts 208, 222, 224, and parts 300, 302, 304 to be described hereinafter, a linkage of the dashpot type. The rod 208 may be slidably supported within guide openings 226 and 228 provided in a spider member 230 and an upper wall portion 232 of the oil-filled damping chamber 224.

A second rod-like member 234 may be mounted in the valve casing 200 to be rotatable about the axis thereof and may present a camming member 236 at an upper terminal end thereof. The link member 114 (see FIG. 6) may normally project from intermediate the terminal ends of the second rod 234, for connection with the actuating member 112.

A cantilevered member 242 may be secured to the finger element 210 so that, when the cantilevered free end 244 of the element 242 is depressed, the finger 218 is urged outwardly from engagement within the recess 212 of the bell member 206.

This last mentioned action is illustrated in FIG. 9. As can be seen, by a perusal of FIG. 9, when the camming member 236 of the rotatable second rod member 234 is rotated into engagement with the cantilevered member 242, the end 244 of the member 242 is depressed to urge the finger member 210 outwardly from engagement within the recess 212, defined by a portion of the camming member 214 of the bell member 206.

Referring back to FIG. 7, it can be seen that, when the finger 210 releases the cam portion 214 of the bell 206, the spring 216 urges the bell 206 downwardly over the valve disc 220. At this point, water being pumped through the casing 200 is forced to flow through the openings 218 of the bell 206. This is because the cylindrical wall portion 246 of the bell 206 blocks off the normal flow path indicated by flow lines 250.

Accordingly, pressure builds up on an upper surface 252 of the valve member 220 and forces the valve member and the rod 208 (rigidly secured thereto) downwardly against an upward spring bias of a spring 254. Additionally, water pressure asserted downwardly on the upper surface of the valve member 220, forces the disc-like piston 222 downwardly through the oil-filled damping chamber 224. This last action operates as a timing mechanism.

IV. Cycle Counting, Pump Shutoff, and System Recocking Mechanisms

A pinion member 300 may be rigidly mounted on a rotable shaft 302 for engagement within a rack member 304, formed as a part of the reciprocating rod 208. Accordingly, as the reciprocating rod 208 moves downwardly under the pressure of the water flow on the upper surface 252 of the valve 220, the shaft 302 is rotated through a half revolution. Referring briefly back to FIG. 6, it can be seen that this half revolution of shaft 302 may be utilized to operate a lever 306 which may function as a pump shut-off switch and a cycle counter.

Simultaneously with the rotation of the shaft 302, as the reciprocating rod 208 reaches the bottom of its stroke the finger 210 is cammed over the cam portion 214 of the bell member 206 (which is now resting on surface 260 of the overall valve 102) so as to re-engage within the recess 212.

Accordingly, when the rod 208 has reached the full stroke of its downward movement the pump is shut off and the spring 254 is operable to urge the rod back upwardly with the bell 206 now re-secured to the upper terminal end thereof (by means of the re-engaged finger 210).

Upon reaching the upward position of the overall stroke, the reciprocating rod 208 is operable to recycle the shaft 302 so as to reactuate the pump. Whereupon, the water flow is re-established along the flow lines 250.

It will be noted that the finger portion 210 may be formed with an outwardly extending portion 262 presenting an aperture 264 whereby the portion 262 is slidably disposed over the rotatable rod 234. This arrangement prevents the rotation of the finger 210 about the axis of the reciprocating rod 208.

V. Summary of Overall Operation

Briefly then, the operation of the overall system contemplates a back pressure on the filter F due to the saturation thereof with dirt particles. The back pressure sensing element 100 is operable to actuate the lever 114 to rotate the rotatable rod 234. At this point, the camming member 236, on rod 234, disengages the finger 210 from the bell, allowing the bell to fall over the outlet of the valve 202.

The water being pumped into the filter tank 20 can now only flow through the openings 218 of the bell 206. Accordingly, the pressure build up on surface 252 of the valve 220 is operable to urge the valve 220 and the rigidly attached rod 208 downwardly. The time period required for the rod 208 to move through its full downward stroke may be determined by the damping arrangement disposed within the oil-filled chamber 224.

When the rod 208 has reached its full downward stroke, the shaft 302 is operable to shut off the pump and the finger member 210 re-engages within the recess 212 of the bell 206. Accordingly, with the lack of pressure due to the shut-off pump, the spring 254 is operable to reposition the rod 208 (carrying the bell 206, by the finger 210) back into the normal upward position. When the rod 208 reaches the upward position of its stroke, shaft 302 is operable to re-start the pump and the normal water flow lines 250 are re-established.

Of course, it is to be understood that the expandable/compressible air bag 34 is being compressed to within a fraction of its initial volume (due to water pressure provided by the pump) while the reciprocating rod 208 is moving through its downward stroke. Accordingly, when the pump is shut off at the lower position of the stroke of the rod 208, the pressure is immediately relieved and the air bag 34 suddenly expands to force the water, surrounding the air bag, back through the filter substrate so as to "bump" the diatomaceous particles 30 off the substrate.

Therefore, an automatic "bumping" operation is provided.

It can thus be seen that an improved system for "bumping" particulate filters for swimming pools is herein provided. The operation is virtually fool proof and the apparatus required to carry out the method is relatively inexpensive.

The elements comprising the overall combination presented, are trustworthy in that they may be cycled through virtually thousands of operations without requiring replacement.

SCOPE OF THE INVENTION

While what has been described herein is a preferred embodiment of the present invention, it is of course to be understood that various modifications and changes may be made therein without departing from the invention. Accordingly, it is intended to cover in the following claims all such modifications and changes as may fall within the true spirit and scope of the present invention.

I claim:

1. A method for homogenizing particles of a particulate filter with captured particles of dirt deposited on and within the filter, said filter being of the type having a spaced-apart inlet and outlet and a filter substrate dividing the space therebetween into one area at the upstream side of the substrate communicating with the inlet and another area at its downstream side communicating with the outlet, comprising the steps of:

disposing a layer of the particles on said porous filter substrate at the upstream side thereof;

disposing a compressible/expandable element, in the form of a hollow body the wall of which is flexible and impervious to fluids, downstream from the substrate at a location between the substrate and the outlet;

sealing said body against the admission of fluids;

preventing outlet fluid flow from the filter, while maintaining the inlet open and the filter and the element substantially immersed within the fluid;

suddenly expanding the element to temporarily reduce the volume of the fluid-filled area on the downstream side of the substrate in respect to the area at the upstream side thereof, then increasing the volume of said area on the downstream side;

whereby at least some of the fluid, surrounding the element, is forced back through the filter substrate in an upstream direction so as to "bump" the layer of particles off the filter substrate; and as a final step removing from the filter the particles bumped from the substrate.

2. A method according to claim 1, with the additional step of compressing the element, before suddenly expanding the element.

3. A method according to claim 2, wherein the step of compressing the element comprises the step of increasing pressure throughout said areas, and specifically in a space in which said element is confined, above that within the element; and the step of expanding the element comprises the step of suddenly lowering the pressure within said element-confining space below that within the element.

4. In a filtering system including a filter tank, a pump for directing liquid through an inlet into the tank, a liquid outlet formed in the tank, and a particulate filter disposed between the inlet and outlet to define inlet and outlet chambers between the substrate and the inlet and outlet respectively, said particulate filter comprising a layer of particles disposed on an upstream side of a porous filter substrate member, an apparatus for homogenizing the filter particles with particles of captured dirt deposited on and within the filter, comprising:

an expandable/compressible member disposed within said outlet chamber, said member being in the form of a hollow body having a flexible wall impervious to the passage of the liquid pumped through the tank, said member being sealed against the admission of said liquid;

means for closing off outlet liquid flow from the filter tank, while leaving the inlet open to the flow of liquid into the tank for compressing said expandable/compressible member to within a fraction of its original volume;

means for suddenly expanding said expandable/compressible member for temporarily reducing, to the extent said member is expanded, the volume of the outlet chamber;

whereby at least some of the liquid surrounding the element is forced back through the filter substrate in an upstream direction so as to bump the layer of particles off the filter substrate; and means for removing from the filter the particles bumped from the member.

5. Apparatus according to claim 4, wherein said expansible/compressible member comprises an inflatable air bag.

6. Apparatus according to claim 4, wherein said means for closing off outlet liquid flow from the filter tank comprises automatic outlet valve means, operable to close said outlet in response to a back pressure caused by said filter having a high dirt content, said means for suddenly expanding said member after compression thereof comprising a linkage of the dashpot type and a pump switch, controlled thereby, said linkage responding to operation of said automatic outlet valve means to actuate the pump switch for shutting down the pump following lapse of a predetermined time interval after closure of said outlet.

7. Apparatus according to claim 5, wherein the pump is operable to pressurize the liquid in the tank, after said outlet valve means is closed; and pump shut off means is provided for shutting off said pump, after a predetermined time lapse, in response to the movement of said outlet valve means;

whereby said expansible/compressible member is compressed to within a fraction of its original volume during said time lapse by the pump means until said pump shut off means is actuated;

whereupon, a sudden liquid pressure drop, caused by shutting off the pump, is operable to suddenly expand said expansible/compressible member.

8. A filtering device connectable to a pump and adapted for filtering a liquid forced therethrough by said pump, comprising:

a filter tank having an inlet through which a liquid to be filtered is forced responsive to operation of said pump, said tank having an outlet for the filtered liquid;

a filter pervious to the passage of liquids, said filter being mounted within the tank and partitioning the same into inlet and outlet chambers communicating with the inlet and outlet respectively, said filter having a surface faced toward the inlet chamber upon which particulates incapable of passing through the filter accumulate within the inlet chamber;

a bag disposed wholly within the outlet chamber, said bag confining a gas and being compressible and expansible responsive to increase and decrease, respectively, of the pressure exerted thereagainst by the liquid within the tank in respect to the pressure of the gas confined within the bag;

means for temporarily increasing the liquid pressure against the bag to compress the same;

means for suddenly reducing the liquid pressure against the compressed bag to expand the same and thereby reduce temporarily the outlet chamber volume, for flow of the liquid through the filter from the outlet to the inlet chambers with consequent bumping of said particulates from the filter surface upon which they have accumulated and means for removing from the filter tank the particulates bumped from the filter surface.

9. A filtering device as in claim 8 wherein said means for compressing the bag comprises a valve controlling flow of the liquid through the outlet and operable to close the outlet while liquid is still being pumped into the tank.

10. A filtering device as in claim 9 in which said valve is sensitive to the accumulation of particulates on said surface to an extent predetermined as excessive and responds to said excessive accumulation to close the outlet.

11. A filtering device as in claim 10 wherein the means for suddenly decreasing the pressure of liquid against the bag includes a dashpot linkage responding to closure of said valve to stop operation of the pump after a predetermined lapse of time following closure of the outlet valve.

* * * * *